United States Patent [19]
Harding

[11] Patent Number: 5,577,419
[45] Date of Patent: Nov. 26, 1996

[54] METHOD FOR MAKING A NOVEL STEERING WHEEL AND THE STEERING WHEEL PRODUCED THEREBY

[76] Inventor: Stephen A. Harding, 1830 W. Mission Dr., Chandler, Ariz. 85224

[21] Appl. No.: 331,185

[22] Filed: Oct. 28, 1994

[51] Int. Cl.[6] .............................. B42D 1/04; B21D 53/26
[52] U.S. Cl. ................ 74/552; 74/558; 29/894.1
[58] Field of Search ............. 29/894.1, 894.33, 29/894.34, 894.341, 894.342, 894.343; 74/552, 558

[56] References Cited

U.S. PATENT DOCUMENTS

| | | | |
|---|---|---|---|
| 1,578,215 | 3/1926 | Stoler | 29/894.33 |
| 1,660,319 | 2/1928 | Ash | 29/894.33 |
| 2,162,088 | 6/1939 | Jonas | 74/552 |
| 2,276,477 | 3/1942 | George | 74/552 |
| 2,351,289 | 6/1944 | Rickard | 29/894.1 |
| 3,270,581 | 9/1966 | Geller | 29/894.1 |
| 4,038,735 | 8/1977 | Dekker | 29/894.1 |

FOREIGN PATENT DOCUMENTS

| | | | |
|---|---|---|---|
| 630318 | 8/1927 | France | 74/552 |
| 2674207 | 9/1992 | France | 74/552 |
| 5659473 | 10/1979 | Japan | 74/552 |

OTHER PUBLICATIONS

Streetscene, Jun. 1994, p. 104, "LeCarra 9 Bolt Bango Wheels".
LA Wire Wheels advertisement.
Cragar Advertisement.
Real Wheel Corporation catalogue, "Real Diamond and Real Diamond Gold".
Roadster Wheels advertisement "Royal".
Roberts Tires Wheels advertisement "Roadster Royal".

*Primary Examiner*—P. W. Echols
*Attorney, Agent, or Firm*—Snell & Wilmer L.L.P

[57] ABSTRACT

A novel method for making a steering wheel is provided. The steering wheel so produced is also provided. The steering wheel preferably comprises a hooped channel (felly) which is dimpled and pierced. A central hub assembly is also provided, the hub having also been pierced and the holes therein countersunk. The hub and channel are interconnected through the use of a plurality of spokes, preferably aesthetically arranged to generally correspond to the arrangement of spokes of a vehicle wheel with which the steering wheel may be used. Once appropriately interconnected, a grip is applied to the outer portion of the channel, and the steering wheel is then ready for use.

19 Claims, 4 Drawing Sheets

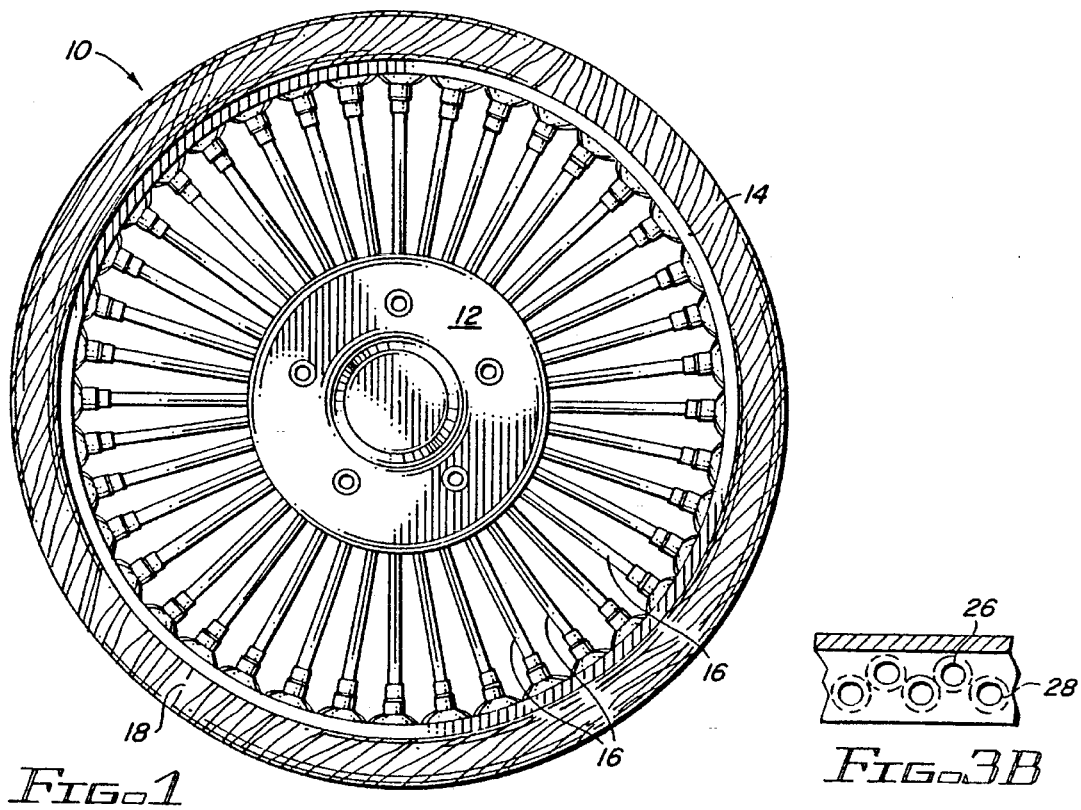
FIG. 1
FIG. 3B
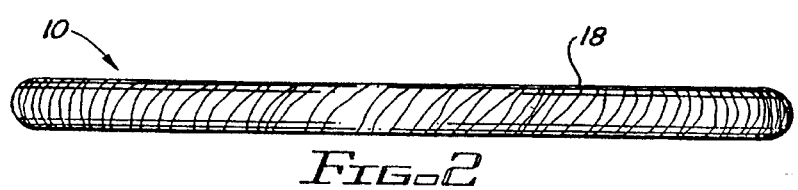
FIG. 2
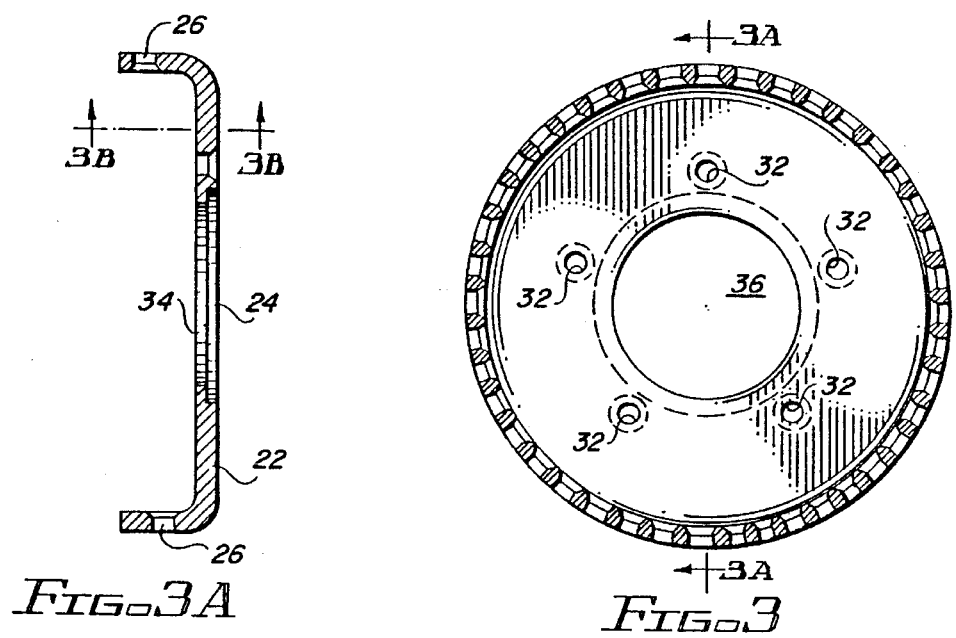
FIG. 3A
FIG. 3

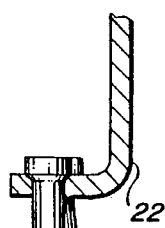
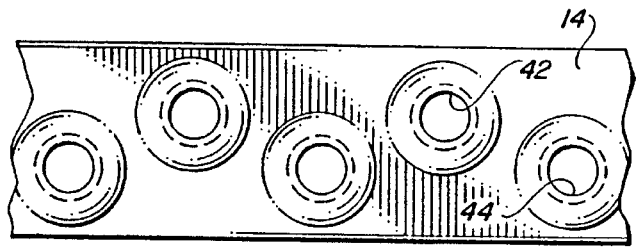
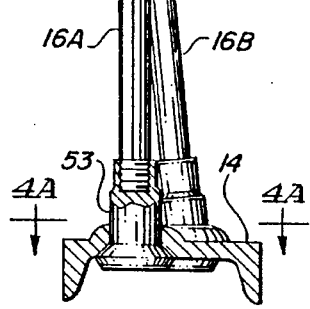
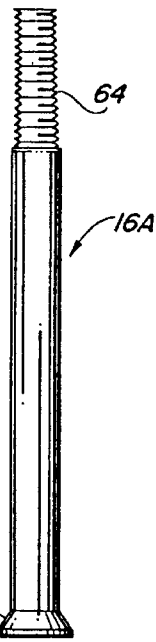
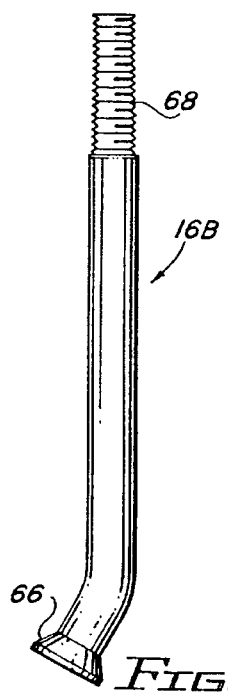
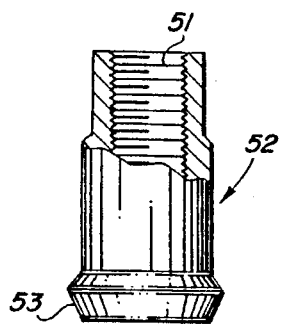
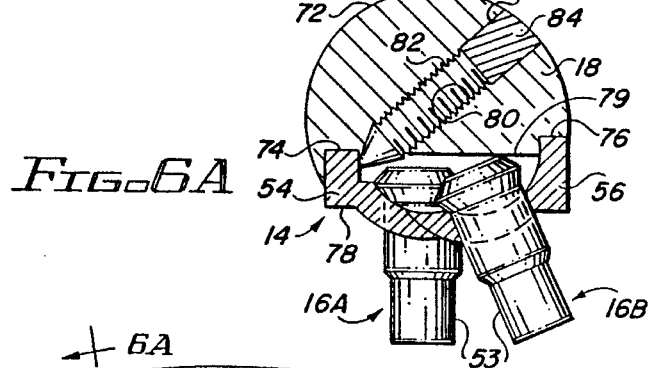
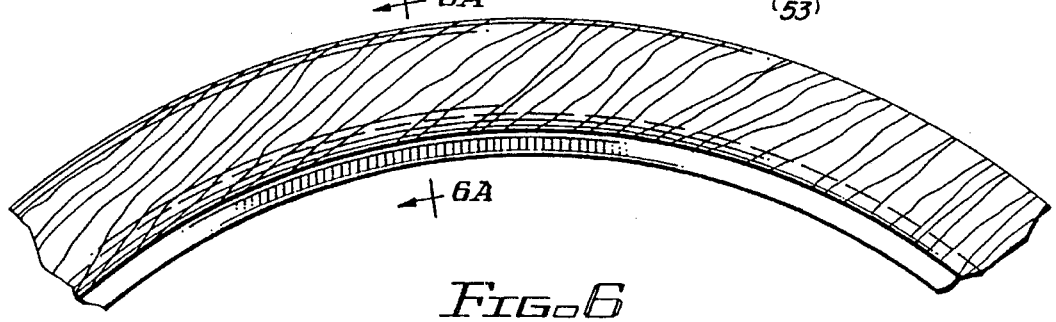

5,577,419

METHOD FOR MAKING A NOVEL STEERING WHEEL AND THE STEERING WHEEL PRODUCED THEREBY

TECHNICAL FIELD OF THE INVENTION

The present invention relates, in general, to a novel method for making steering wheels having aesthetically pleasing appearances. More particularly, the present invention relates to a method of making a steering wheel preferably having a wire spoke central hub, and the steering wheel produced thereby.

BACKGROUND OF THE INVENTION

As is well known, most vehicles are provided with a steering shaft within a steering column to which a steering wheel is attached. For convenience, the subject invention will be described principally with respect to automobiles, trucks and other vehicles; it should be appreciated, however, that other applications (i.e., boats, planes, etc.) are within the scope of the subject invention.

Typically, as is the case with automobiles, the steering shaft extends from the steering column to inside the cab of the vehicle. The steering wheel which is attached to the steering shaft must be configured to enable the user to turn it, generally about its central axis, to effect movement of the vehicle. Moreover, the steering wheel must be able to withstand torsional forces, such as may be applied by pressure on opposite or opposing sides of the wheel, such as if the vehicle is involved in an accident and the driver torques on the steering wheel.

As is also well known, most steering wheels comprise a circular wheel having a center hub. The hub is generally configured to carry a horn, an air bag, and/or other items; e.g., electronic switches and the like. As is known, the hub is suitably configured to be attached, such as by arms or spokes, to the outer wheel such that axial rotation of the wheel causes rotation of the hub, which in turn causes rotation of the steering shaft.

While various types of steering wheels are currently known, it is generally not known that steering wheels can be made to have an aesthetically pleasing appearance, particularly an appearance similar to the appearance of the vehicle wheels with which they are used. This is particularly true for wire spoke wheels, such as the wheels sold by the assignee of the present application under the trademarks TRU-SPOKE and/or TRU-CRUISER. For many reasons and purposes which will be obvious to the reader, it may be desirable to have a steering wheel design which bears a resemblance to the vehicle wheel design. For example, in shows or other festive events, having a steering wheel with an appearance which resembles the vehicle wheels may be desirable.

Given the differences in dimensions, uses and purposes, however, wheel-building technology is not directly applicable to the manufacture of steering wheel technology. In point of fact, despite the advent and existence of a wide variety of decorative and designer steering wheels, no known steering wheels provide an aesthetically pleasing close resemblance to existing vehicle wheels, particularly wire-spoked vehicle wheels. Moreover, the present inventor is unaware of any teaching or suggestion in any art available, prior to the development of the methods and devices set forth herein, which would render obvious the use of wheel-building technology in the manufacture of steering wheels.

SUMMARY OF THE INVENTION

In accordance with a particularly preferred embodiment of the present invention, this need in the art is addressed by providing a novel method for making a steering wheel such that the steering wheel produced thereby possesses an aesthetically pleasing appearance which closely resembles the appearance of vehicle wheels of the vehicle with which the steering wheel is used. While the way in which the present invention addresses this need will be described in the following description of the preferred and alternative embodiments, generally, a hooped channel (felly) is provided, dimpled and pierced. A central hub is also provided, the hub having also been pierced and the holes therein countersunk. The hub and channel are interconnected through the use of a plurality of spokes, preferably aesthetically arranged to correspond to the arrangement of spokes of the vehicle wheel. Once appropriately interconnected, a steering rim (grip) is applied to the outer portion of the channel, and the steering wheel is then ready for use.

More particularly, a method for making a steering wheel in accordance with a preferred aspect of the present invention comprises the steps of providing a felly of an appropriate diameter for a steering wheel and a central hub suitably configured for placement with the felly and having a system for connecting the hub to a steering shaft. A plurality of holes are thereafter formed in both the felly and the hub. Spokes having a first end engageable with the holes in the felly and a second end engageable with the holes in said hub are provided and then used to interconnect the hub and felly. The hub is then affixed and the hub is attached to the steering shaft, and thereafter a horn button kit is affixed to the hub. A steering wheel produced by this method is also provided.

BRIEF DESCRIPTION OF THE DRAWING FIGURES

Preferred and alternative exemplary embodiments of the present invention will hereinafter be described in conjunction with the appended drawing figures, wherein like designations denote like elements, and:

FIG. 1 is a front elevational view of a steering wheel in accordance with the present invention;

FIG. 2 is a side elevational view of the steering wheel of FIG. 1;

FIG. 3 is a bottom plan view of the hub of the steering wheel of FIG. 1;

FIG. 3A is a sectional view of the hub of FIG. 3 taken along the line 3A—3A;

FIG. 3B is an exploded view of the highlighted aspect of the hub shown in FIG. 3A;

FIG. 4 is a schematic view showing the spoke interconnection of the hub and channel of the steering wheel of FIG. 1;

FIG. 4A is a schematic view of a portion of the channel of the steering wheel of FIG. 1 which has been dimpled and pierced;

FIG. 4B is a schematic sectional view of a nipple useful on connection with the steering wheel of FIG. 1;

FIG. 5A is an enlarged schematic view of an interconnecting spoke useful in the context of the steering wheel of FIG. 1;

FIG. 5B is an enlarged schematic view of a further type of interconnecting spoke useful in the context of the steering wheel of FIG. 1;

FIG. 6 is a front view of a portion of the outer channel and grip of the steering wheel of FIG. 1;

FIG. 6A is a sectional view taken along the line 6A—6A of FIG. 6;

DETAILED DESCRIPTION OF PREFERRED EXEMPLARY EMBODIMENTS

Figure 7:
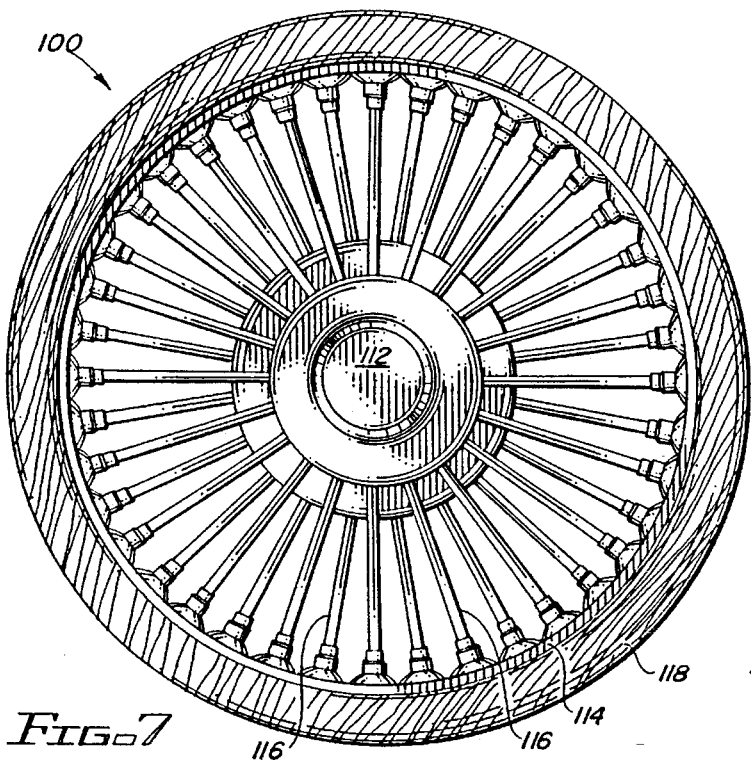
FIG. 7 is a front elevational view of an alternative embodiment of a steering wheel of the present convention.

With reference to FIG. 1, a preferred embodiment of a steering wheel 10 in accordance with the present invention generally includes a central hub assembly 12, a channel (felly) 14, a plurality of interconnecting spokes 16, and an outer grip 18. As will be appreciated, steering wheel 10 has an aesthetically pleasing appearance generally corresponding to the external automobile wheel manufactured by Cragar Industries, Inc. under the TRU-CRUISER trademark. It should be appreciated, however, that various other ornamental designs may be formed in steering wheel 10 and the particular design shown in FIG. 1 is for illustrative purposes only.

In general, steering wheel 10 is suitably configured to be attached to a steering shaft (not shown) contained within the steering column of a vehicle (also not shown), and when so attached is useable to manipulate and maneuver the direction of the vehicle in a conventional manner. While the manner in which steering wheel 10 is attached to the steering shaft will be described in greater detail hereinbelow, suffice it to say that when it is so attached it is functional as a conventional steering wheel for vehicle use. In particular, steering wheel 10 may be suitably rotated about its central axis to effect movement of the steering shaft, which in turn effects movement of the vehicle with which steering wheel 10 is employed.

As previously briefly noted, while the various preferred embodiments of the invention will be described in connection with a steering wheel which is particularly well-suited for use with automobiles, it should be appreciated that the method for making a steering wheel described herein is not so limited. Various applications to other vehicles, e.g., boats, etc. which are now known or hereafter devised by those skilled in the art, are well within the scope and application of the present invention.

With reference now to FIGS. 2 and 4, it can be seen that in accordance with this embodiment of the present invention, spokes 16 interconnect channel 14 and hub assembly 12 in a manner which enables steering wheel 10 to have a uniform planar appearance. That is, spokes 16 and hub assembly 12 are suitably configured and positioned such that they are within the plane defined by the width or thickness of outer grip 18.

Referring now to FIG. 3, hub assembly 12 preferably comprises a base 22 including a central aperture 24 in the top surface thereof. With reference to FIGS. 3, 3A and 3B, it can be seen that hub base 22 preferably includes a plurality of respective apertures 26 and 28 which are suitably formed in the side wall of base 22. Apertures 26 and 28 are preferably spaced apart equidistantly; preferably at an angular spacing (in accordance with the angle Φ wherein Φ is between about 5° and 15°, preferably about 9°. With particular reference to FIG. 3B, apertures 26 are preferably offset from apertures 28 to permit, as will be discussed below, the insertion of spokes 16 therein. In accordance with a preferred aspect of this embodiment of the invention, apertures 26 and 28 are also preferably angularly oriented with respect to a center line extending through the aperture by an angle α. Preferably, angle α is in the range of 2° to 6°, and optimally is 3°. Further, apertures 26 and 28 are suitably countersunk so that spokes 16 can be snugly seated therein as will be described hereinbelow.

With continued reference to FIG. 3A, a plurality of further apertures 32 are preferably formed in the upper or top portion of base 22 to facilitate mounting of steering wheel 10 to a steering shaft (not shown) of a vehicle. In accordance with this embodiment, steering wheel 10 is preferably mounted to the steering shaft through use of a Grant Steering Wheel Adapter Kit and a Grant adapter extension (Grant No. 4000) both of which are available from Grant Adapter Products of Glendale, Calif. In particular, apertures 32 are suitably positioned so that five (5) bolts (not shown) may be passed therethrough, which, as those skilled in the art will recognize, are contained in the standard Grant Adapter Extension Kit. The extension is in turn attached to the adapter, in a conventional fashion, which in turn is affixed to the steering shaft. As will be appreciated, should one desire to use other kits in connection with steering wheel 10, hub assembly 12 may be suitably formed to interconnect therewith.

With continued reference to FIG. 3A, base 22 is also suitably configured to receive a standard horn button kit. Preferably, the top portion of base 22 is configured such that a receiving lip 34 is formed at the opening of aperture 24. With reference to FIG. 1, a horn button cap 36 is receivable aperture 34. Cap 36 is suitably configured to receive a horn button assembly (kit), such as those also conventionally available from Grant Adapter Products.

While hub assembly 12 including base 22 and horn cap 36 can be made of any suitable material, in accordance with a preferred aspect of this embodiment of the invention such components are formed of steel. Preferably base 22 comprises cold rolled or HPRO steel and cap 36 comprises AKDQ quality sheet steel. Moreover, base 22 and horn cap 36 are preferably plated with conventional gold and/or chrome plating.

With reference now to FIGS. 4, 4A and 6A, outer channel 14 is preferably also configured to receive spokes 16 as well as grip 18. As shown best in FIGS. 4 and 4A, channel (felly) preferably includes a plurality of apertures 42 and 44 which are preferably offset (see FIG. 4A) from one another.

Apertures 42 and 44 are suitably formed with corresponding dimples 46 and 48 extending as protuberances on the inner side of felly 14. Dimples 46 and 48 preferably have an outer radius complementary of the nipples 52 (see FIG. 4B) which are inserted therein, typically in the range of about 0.25 to 0.30 inches, optimally about 0.281 inches. Dimples 46 and 48 are preferably formed, and thereafter channel 14 is pierced.

In accordance with a particularly preferred aspect of this embodiment of the present invention, apertures 42 and 44 are preferably formed by piercing the hooped channel in accordance with conventional practices. Apertures 42 and 44 are preferably formed in a spaced-apart relation, equidistantly spaced about the circumference of felly 14. Preferably, apertures 42 and 44 are disposed at an angular distance $\psi$ wherein $\psi$ is between about 5° and 15°, preferably about 9°.

Nipples 52 preferably have a generally frustro-conical configuration, one end of which is adapted to receive the threaded portion of spoke 16 and the other end which is adapted to be received within dimples 46 and 48. With reference to FIG. 4B, nipples 52 preferably include a threaded end 51 and an enlarged end 53. As will be described hereinbelow, end 51 is engageable with spokes 16 while end 53 is engageable with channel 14.

Channel 14 is preferably formed of AKDQ steel such that, as shown best in FIG. 6A, respective legs 54 and 56 are formed therein. Channel 14 preferably is configured to have a width dimension in the range of 0.75 to 2.0 inches, optimally about 1.25 to 1.5 inches. With continued reference to FIG. 6A, legs 54 are generally longer than legs 56, which facilitates improved attachment of grip 18 to felly 14.

As shown best on FIG. 4, base 22 and channel 14 are interconnected by a plurality of spokes 16. Preferably spokes 16 are formed in at least two different configurations. As is shown best in FIGS. 5A and 5B, the spokes 16A are suitably formed to be substantially straight, while the spokes 16B are suitably formed with an angularly disposed end. More particularly, and with continued reference to FIGS. 5A and 5B, spokes 16A preferably comprise steel (grade 8740) and are formed with a head 62 at one end and a threaded portion 64 at the other end. Similarly, spokes 16B also have a head 66 at one end thereof and a threaded portion 68 at the other end thereof. Spokes 16B are, however, suitably bent in proximity to head 66 an angle of between about 5° and about 15°, preferably about 10°.

It should be appreciated that felly 14 and spokes 16, like hub assembly 12, may be plated, for example, with gold, chrome, or both. In accordance with one aspect of the present invention, felly 14 and hub assembly 12 can either be chrome or gold plated and spokes 16 are plated of a different color or of alternating colors.

With reference now to FIGS. 6 and 6A, grip 18 preferably is attached in an aesthetically pleasing manner to felly 14. Preferably, grip 18 comprises a polymeric or wood material, walnut or other equally hard wood being particularly preferred; however, any material which has or can be modified to have suitable grip characteristics is usable in the context of the present invention.

Grip 18 is suitably configured to engage and mount to felly 14, while at the same time providing a convenient gripping surface. To that end, and again with reference to FIG. 6A, grip 18 preferably comprises an accurate upper surface 72 which terminates in a front lip 74 and a back edge 76. Lip 74 and edge 76 are suitably connected by a lower surface 78. A ledge 79 is formed interiorly of back edge 76. A plurality of apertures 80 are suitably positioned about the circumference of grip 18 to facilitate, as shown in FIG. 6A, the receipt of a plurality of set screws 82 enabling the securing of grip 18 to channel 14. In accordance with a preferred aspect of this embodiment, five (5) apertures 80 receive five (5) set screws 82, each aperture 80 which is positioned about 72° apart. Optimally, a plug 84 can be placed into the upper portion of aperture 80 after screw 82 receivable therein is used to secure grip 18 to channel 14.

Having now described the preferred aspects of the components of steering wheel 10, the method of assembly will now be described. In general, and in accordance with a preferred aspect of this embodiment of the present invention, felly 14 is first formed into a hoop having a typical diameter for a steering wheel (i.e., on the order of between about 10 to 14 inches, preferably on the order of 11.5 to about 12 inches). Once so formed, leg 54 is suitably formed to have a length less than that of leg 56; the varying dimensions of the legs of felly 14 enable ease of application of grip 18. Felly 14 is then dimpled and pierced so that apertures 42 and 44 and dimples 46 and 48 are suitably formed therein. As previously noted, apertures 42 and 44 are formed interiorly of dimples 46 and 48 such that on the inside surface of felly 14 a series of protuberances (i.e., 46, 48) having holes therein are produced. Typically, channel (felly) 14 is then plated, for example, with a gold and/or chrome plating.

Hub assembly 12 is then suitably prepared to receive an end of spokes 16. Preferably, apertures 26 and 28 are suitably formed on base 22 and thereafter such holes are countersunk to facilitate receipt of heads 62 and 66 of respective spokes 16A and 16B. Horn button cap 36 is then formed and suitably configured to receive a standard horn button assembly kit. Hub assembly 12 is also suitably configured to be adaptable to and engageable with a standard steering wheel adapter kit, such as by providing apertures 32 therein. Hub assembly 12 is also then preferably plated; e.g., chrome or gold plating.

Typically, hub assembly 12 is thereafter mounted to a fixture (not shown) to facilitate lacing of spokes 16A and 16B therethrough, and ultimate interconnection of hub assembly 12 and channel 14. In accordance with a particularly preferred aspect of this embodiment of the present invention, hub assembly 12 is suitably fixed such that spokes 16A and 16B can be inserted through apertures 26 and 28 and such that heads 62 and 66 suitably mate with apertures 26 and 28. Once so inserted, threaded portions 64 and 68 of respective spokes 16A and 16B are inserted into the dimpled and pierced apertures 42 and 44 of felly 14. Nipples 52 are then placed through apertures 42 and 44 such that the enlarged end 53 seats within apertures 42 and 44, and more particularly within dimples 46 and 48. Preferably spokes 16A and 16B are configured such that heads 62 and 66 are provided with a device, e.g., Allen wrench receiving portion (not shown), so that spokes 16A and 16B can be securely held while threaded ends 51 of nipples 52 are secured to threaded portions 64 and 68 thereof. As will be appreciated by those skilled in the art, tightening of spokes 16A and 16B must be done in a uniform fashion such that misalignment of the spokes, hub or felly does not occur.

Grip 18 is thereafter applied. Preferably, as mentioned hereinabove, grip 18 is suitably configured to be received on channel 14, the front edge, namely lip 74 which is preferably configured to form a cosmetic interface with front leg 56 of channel 14. Edge 76 of grip 18 in turn mates with the top of leg 54 of channel 14 and ledge 79 mates with the front of leg 54 to suitably prevent further movement of grip 18 in the rearward direction when applied. Preferably, grip 18 is suitably dimensioned to provide a snug force-fit with channel 14. Optimally, however, a suitable amount of an adhesive, for example a silicon adhesive, may be applied to felly 14 and/or grip 18 prior to joining the two together. Once so joined, however, set screws 82 are suitably inserted into apertures 80 and caused to engage front leg 52. Plugs 84 are thereafter inserted and grip 18 is cosmetically finished, polished and the like.

Once so assembled, steering wheel 10 is suitably affixed to the steering shaft. Thereafter the aforementioned horn button kit can be inserted into aperture 24 and horn button cap 36 affixed to hub assembly 12.

It should be appreciated that the orientation of hub assembly 12 and channel 14 can be adjusted as necessary, or the components themselves modified as necessary to achieve an aesthetically pleasing steering wheel. For example, and with particular reference to FIGS. 7–11, an alternative embodiment of the present invention provides steering wheel 100. It will be appreciated by those skilled in the art that the steering wheel of this embodiment has an aesthetically pleasing appearance generally resembling the external automobile wheel manufactured by Cragar Industries, Inc. under the TRU-SPOKE trademark.

In accordance with a preferred aspect of this alternative embodiment, steering wheel 100 preferably comprises a central hub assembly 112, an outer channel 114, a plurality of interconnecting spokes 116 and an outer grip 118. Grip 118, channel 114 and spokes 118 are substantially similar to grip 18, channel 14 and spokes 16 described hereinabove, with the exception of the modifications described hereinbelow. In this embodiment, however, hub assembly 112 is quite different than hub assembly 12 comprising base 22.

Figure 9A:
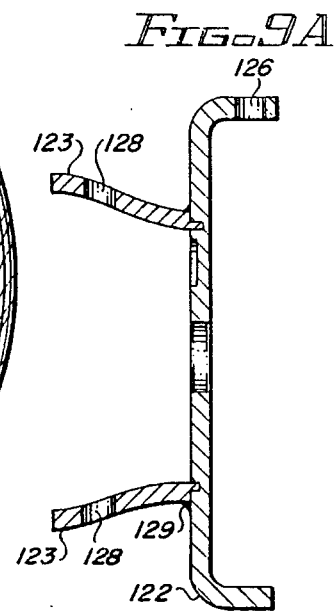
FIG. 9A is a sectional view taken along the line 9A—9A of FIG. 9.
Figure 9B:
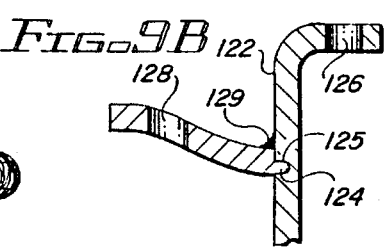
FIG. 9B is an exploded schematic view of the highlighted section of FIG. 9A.

In particular, and with reference to FIGS. 9A and 9B, hub assembly 112 comprises a base 122 and a substantially cylindrical upstanding housing 123 suitably affixed thereto. As shown best in FIGS. 9 and 9A, housing 123 is preferably attached to base 122 by a tongue and groove connection, the tongue 124 which is carried on the lower edge of housing 123 and the groove 125 which is formed in the upper (top) surface of base 122. In accordance with a particularly preferred aspect of this embodiment and with particular reference to FIG. 9B, base 122 and housing 123 may be suitably welded as at 129 completely around the inner or outer periphery of housing 123.

Housing 123 is suitably configured to receive a horn button cap 134 and a standard horn button kit as discussed above. Preferably, to enable easy insertion of the kit, the walls of housing 123 are extruded inwardly of the outer aperture to provide a register (not shown) for the horn button cap and the horn button kit.

Figure 8:
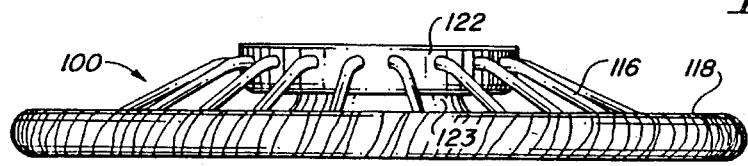
FIG. 8 is a side elevational view of the steering wheel of FIG. 7.

With momentary reference to FIG. 8, the preferred construction of hub assembly 112, as just described, yields a steering wheel 100 which has a protruding hub, as shown. That is, in contradistinction to steering wheel 10, in which hub 12, felly 14 and spokes 16 are all contained within the plane defined by the thickness of grip 18, steering wheel 100 has a multi-layer or domed appearance.

Figure 10:
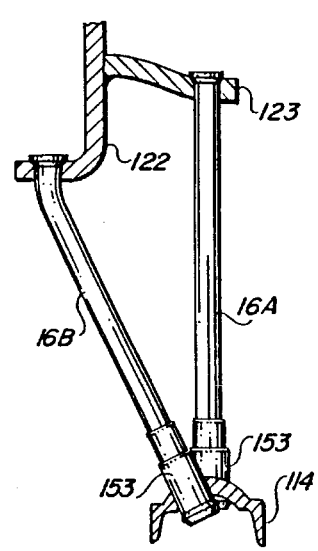
FIG. 10 is a schematic view showing the spoke interconnection of the hub and the channel of the steering wheel of FIG. 7.
Figure 9:
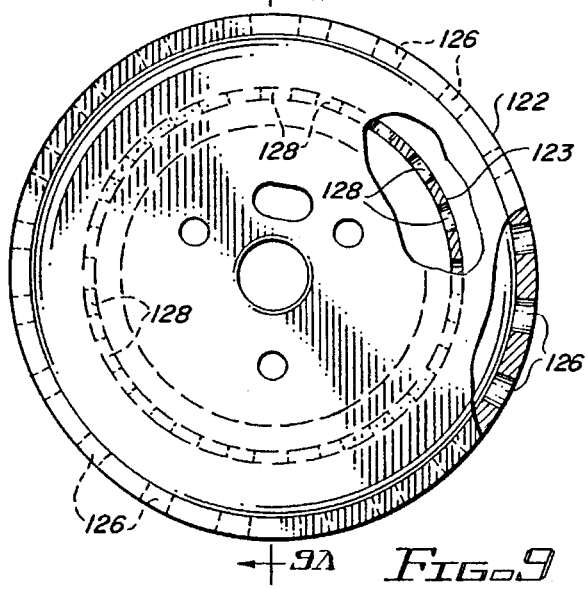
FIG. 9 is a bottom plan view of the hub of the steering wheel of FIG. 7.
Figure 11:
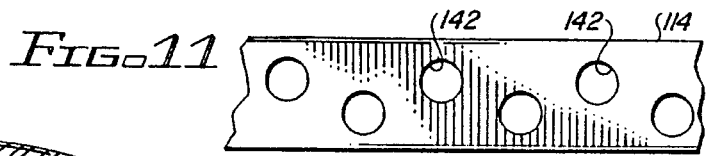
FIG. 11 is a schematic view of a portion of the channel of the steering wheel of FIG. 7 which has been dimpled and pierced.

With reference now to FIG. 10, spokes 116, comprising respective spokes 116A and 116B, interconnect hub assembly 112 and felly 114 by having one series of spokes (i.e., spokes 116A) connected from felly 114 to housing 123 and another series of spokes (i.e., spokes 116B) connected from felly 114 to base 122. As in the case of spokes 16A, spokes 116A are, as shown best in FIG. 10, substantially straight. Similarly, spokes 116B, like spokes 16B, are bent in proximity to the end of the spoke carrying a head (as opposed to the spoke end which is threaded). However, given the construction of hub assembly 112, spokes 116B are bent on the order of between about 20° and 30°, preferably about 20° to about 25° and optimally about 22°.

As noted, spokes 116A and 116B are received in housing 123 and base 122 respectively. More particularly, base 122 is suitably provided with a plurality of apertures 126, preferably pierced equidistantly about the periphery of base 122. In accordance with a particularly preferred aspect of this embodiment, apertures 126 are preferably spaced about 18° from each other. Similarly, and with reference to FIG. 11, housing 123 is suitably provided with a plurality of apertures 128, preferably pierced equidistantly about the periphery of housing 123. In accordance with a particularly preferred embodiment of this aspect of the invention, apertures 128 are also spaced about 18° from each, but only about 9° from the adjacent apertures 126 in base 122. As discussed hereinabove, in connection with steering wheel 10, the apertures in hub assembly 112 (i.e., apertures 126 and 128) are suitably countersunk to receive and seat the head 162 of spokes 116.

Apertures 126 and 128 provided in hub assembly 112, like apertures 26 and 28 in connection with hub assembly 12, are preferably suitably angled to enable insertion of spokes 116 therein. In a particularly preferred aspect of this embodiment of the invention, apertures are angled at an angle $\alpha$ where $\alpha$ is between about 1° and about 5°, optimally 2°.

Moreover, channel 114 is suitably provided with a plurality of apertures 142 which are preferably formed by dimpling and piercing as discussed above. Apertures 142 are suitably dimensioned to receive and seat the enlarged portion 153 of respective nipples 152. (In this regard nipples 152 are substantially similar to nipples 52 discussed hereinabove in connection with steering wheel 10.)

Figure 12:
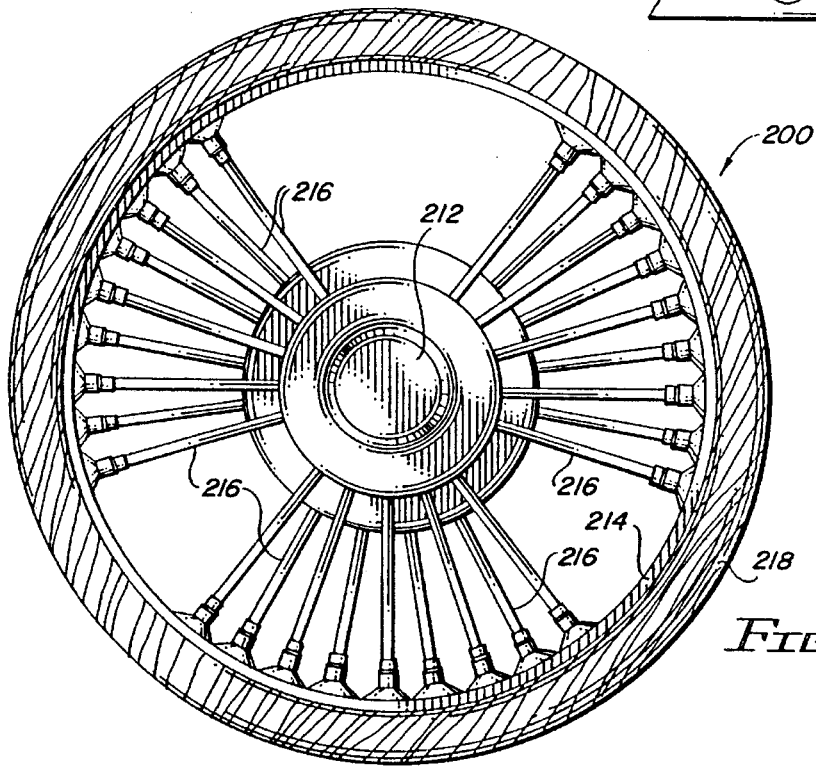
FIG. 12 is an alternative embodiment of the steering wheel of FIG. 7, showing a different spoke orientation.
Figure 13:
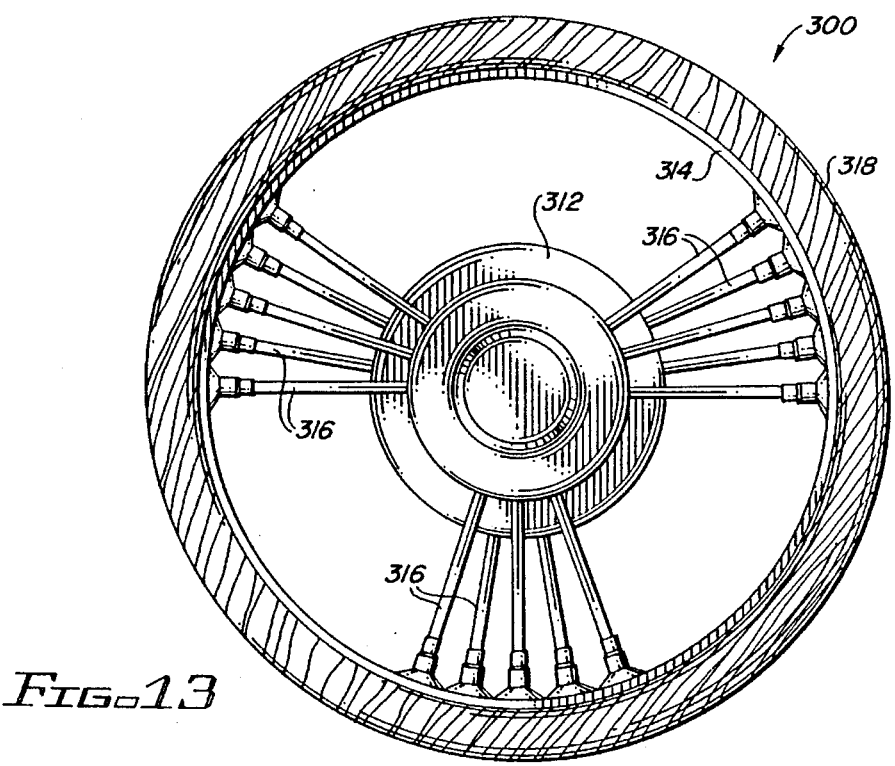
FIG. 13 is a further alternative embodiment of the steering wheel of FIG. 7, showing yet another different spoke orientation.

In accordance with a particularly preferred aspect of the present invention as illustrated with respect to steering wheels 10 and 100, each embodiment includes a plurality of spokes preferably equidistantly dispersed about the periphery of each of the hubs (12 and 112) and channels (i.e., 14 and 114). Preferably, in accordance with each embodiment the spokes (i.e., 16 and 116) are suitably arranged so that 40 spokes are used in interconnecting the hubs (12 and 112) and the channels. It should be appreciated, however, that any number of spokes may be suitably used in accordance with the present invention, as may be necessary for aesthetic or other reasons. For example, with reference to FIG. 12 a steering wheel 200 embodying the general design of steering wheel 100 of FIG. 7 is shown as having only 27 spokes 216 which serve to interconnect hub assembly 212 and the felly 214 to which the grip 218 is attached. Further, and with reference to FIG. 13 a steering wheel 300 also embodying the general design of steering wheel 100 of FIG. 7 is shown as having only 15 spokes 316 which serve to interconnect hub assembly 312 and the felly 314 to which the grip 318 is attached. It should be appreciated, however, that any number of spokes may be employed in any of the steering wheel designs shown herein.

While several embodiments of the present invention have been described in this specification, these descriptions and the drawings are for purposes of illustration only and this invention is to be limited solely by the scope of the claims which are appended hereto. It should be appreciated that the above description is of preferred exemplary embodiments and thus the invention is not limited to the specific forms shown herein. For example, numerous modifications in the orientation of the various components may be utilized as is known or hereafter devised by those of ordinary skill in the art. Moreover, the shape and/or configuration of the various components may be modified as those skilled in the art will appreciate; the shapes and configurations shown herein are for purposes of illustration and not in a limiting sense. These and other modifications may be made in the design and arrangement of the elements within the scope of the invention, as expressed in the claims appended hereto.

I claim:

1. A method for making a steering wheel mountable to a steering shaft, the method comprising the steps of:
   providing a hooped channel;
   providing a central hub suitably configured for placement in the center of said hooped channel, said hub having means for connecting said hub to said steering shaft and means for receiving a horn button therein;
   forming a plurality of holes in said hooped channel;
   forming a corresponding plurality of holes in said hub;
   providing a plurality of spokes for interconnecting said hooped channel and said hub, said spokes having a first and second end, said first end terminating in a head and said second end including a threaded portion, said head of said first end engageable with said holes in said hub and second threaded end engageable with said holes in said hooped channel; interconnecting said hub and said hooped channel with said spokes; providing a grip suitably configured to be disposed on the hooped channel; attaching said hub to the steering shaft through use of said attaching means; and affixing a horn button to said hub.

2. The method according to claim 1, wherein said step of forming a plurality of holes in said hooped channel comprises the steps of:
   forming a plurality of dimples on said hooped channel; and
   piercing said hooped channel at said dimples.

3. The method for making a steering wheel according to claim 2 wherein said step of interconnecting comprises the steps of:
   inserting said spokes through said holes in said hub such that said first head ends of said spokes mates with said hub aperture;
   inserting said second threaded ends of said spokes into said said holes in said hooped channel;
   providing a plurality of nipples having a thread receiving portion therein;
   inserting said nipples into said said holes in said hooped channel such that said second threaded ends of said spokes engage said thread receiving portion of said nipples; and
   uniformly tightening said nipples to securely interconnect said hub and said hooped channel with said spokes.

4. The method for making a steering wheel according to claim 3 wherein said step of providing a hooped channel comprises providing a channel felly having first and second leg members.

5. The method for making a steering wheel according to claim 4 wherein said first leg is longer than said second leg.

6. The method for making a steering wheel according to claim 5 wherein said step of providing a grip comprises providing a grip having a first edge and a second edge.

7. The method for making a steering wheel according to claim 6 wherein said step of attaching said grip further comprises securing said grip to said hooped channel such that said second edge substantially mates with said second leg and said first edge forms a generally cosmetic interface with said first leg.

8. The method for making a steering wheel according to claim 1 wherein said step of forming holes in said hooped channel comprises dimpling and piercing said hooped channel to provide a series of apertured protuberances on the inner side of said hooped channel.

9. The method of making a steering wheel according to claim 8 wherein said step of forming holes in said hub comprises:
   forming a first set of a substantially equidistantly spaced apertures in the side wall of a base of said hub, and
   forming a second set of substantially equidistantly spaced apertures in said base side wall.

10. The method for making a steering wheel according to claim 9 wherein said step of forming a second set of apertures further comprises forming said apertures at an angle with respect to the center line of said aperture, said angle being on the order of about 2° to about 6°.

11. The method for making a steering wheel according to claim 10 wherein said step of forming holes in said hub further comprises the step of countersinking said first and second sets of apertures.

12. The method for making a steering wheel according to claim 11 wherein said step of interconnecting comprises:
   threading said spokes through said first and second sets of hub apertures such that said spoke first head ends seat in said hub apertures;
   aligning said spoke second threaded ends with said dimpled and pierced apertures in said hooped channel; and
   providing a plurality of nipples having a thread receiving portion, placing said nipples through said apertures in said hooped channel and attaching said nipple thread receiving portions to said threaded ends of said spokes.

13. A steering wheel mountable to a steering shaft comprising:
   a channel felly having a plurality of holes formed therein, said felly providing a grip interface;
   a hub assembly suitably configured for attachment to the steering shaft of a vehicle and having a plurality of holes formed therein;
   a plurality of spokes having first and second ends, said first ends of said spokes terminating in a head and said seconds ends of said spokes having at least a portion thereof which includes a threaded portion;
   a plurality of nipples having a thread receiving portion therein;
   wherein said first ends of said spokes are engageable with said holes in said hub assembly, said second ends of said spokes are engageable with said holes in said channel felly, and said nipple thread receiving portions are engageable with said spoke second ends such that said spokes interconnect said hub and said channel felly;
   a grip disposed on said grip interface; and
   a horn button assembly affixable to said hub assembly.

14. The steering wheel of claim 13 wherein said grip comprises:
   an accurate upper surface;
   a front lip;
   a back edge; and
   a lower surface;
   wherein said upper surface terminates in said front lip and said back edge, and said lower surface connects said front lip and said back edge.

15. The steering wheel of claim 14 wherein said grip further includes:

a plurality of apertures positioned about the circumference of said grip; and said steering wheel further includes a plurality of set screws, said set screws receivable within said grip aperture to secure said grip to said hooped channel.

16. The steering wheel of claim 13 wherein said holes in said hooped channel display an interconnecting protuberance.

17. The steering wheel of claim 16 wherein said holes in said hub assembly display an interconnecting circular depression.

18. The steering wheel of claim 17 wherein said holes in said hub assembly comprise first and second sets, said second set offset from a center line passing through the axis of said second set of holes.

19. The steering wheel of claim 18 wherein said offset is between about 2 and about 6° from said center line.

* * * * *